United States Patent
Yamada

(10) Patent No.: US 10,642,552 B2
(45) Date of Patent: *May 5, 2020

(54) INFORMATION PROCESSING APPARATUS, AND NON-TRANSITORY COMPUTER-READABLE MEDIUM STORING INSTRUCTION THEREFOR

(71) Applicant: Brother Kogyo Kabushiki Kaisha, Nagoya-shi, Aichi-ken (JP)

(72) Inventor: Kazutaka Yamada, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,049

(22) Filed: Jun. 21, 2018

(65) Prior Publication Data

US 2019/0095156 A1 Mar. 28, 2019

(30) Foreign Application Priority Data

Sep. 28, 2017 (JP) .................................. 2017-188346

(51) Int. Cl.
*G06F 3/12* (2006.01)
(52) U.S. Cl.
CPC .......... *G06F 3/1259* (2013.01); *G06F 3/1205* (2013.01); *G06F 3/1208* (2013.01);
(Continued)
(58) Field of Classification Search
None
See application file for complete search history.

(56) References Cited

U.S. PATENT DOCUMENTS 6,963,412 B1 * 11/2005 Toda .................. G06F 3/1211
358/1.1
8,917,411 B2 12/2014 Miyata
(Continued)

FOREIGN PATENT DOCUMENTS

JP 2007-011736 A 1/2007

OTHER PUBLICATIONS

Jan. 9, 2019—U.S. Non-Final Office Action—U.S. Appl. No. 16/014,035.
(Continued)

*Primary Examiner* — Fan Zhang
(74) *Attorney, Agent, or Firm* — Banner & Witcoff, Ltd.

(57) ABSTRACT

A non-transitory computer-readable medium stores instructions realizing a printer driver causing, when executed, a controller to output driver-executable information indicating a driver-executable drawing process executable by the printer driver designatable by an operating system to the operating system. The operating system is configured to instruct the printer driver to execute the driver-executable drawing process when a print instruction using the printer driver is received from an application installed in the information processing apparatus, determine whether a particular condition corresponding to a particular driver-executable drawing process of the driver-executable drawing process is satisfied, output driver-executable process information indicating the driver-executable drawing process including the particular driver-executable drawing process to the operating system when it is determined that the particular condition is satisfied, and output the driver-executable process information which does not include the particular driver-executable condition to the operating system when it is determined that the particular condition is not satisfied.

14 Claims, 7 Drawing Sheets

| ITEM | SETTING INFORMATION | FIRST DRAWING FUNCTION IS RECOMMENDED | FIRST DRAWING FUNCTION IS DEPRECATED |
|---|---|---|---|
| PRINT RESOLUTION | 1200 dpi | ○ | - |
| | 600 dpi | ○ | - |
| | 300 dpi | - | ○ |
| SHEET TYPE | NORMAL SHEET | ○ | - |
| | THICK SHEET | ○ | - |
| | INKJET SHEET | - | ○ |
| | GLOSSY SHEET | - | ○ |
| DOCUMENT TYPE | TEXT | ○ | - |
| | GRAPH | ○ | - |
| | PHOTOGRAPH | - | ○ |
| COLOR DESINGATION INFORMATION | 0 × 0000 | - | ○ |
| | 0 × 0001 | - | ○ |
| | 0 × 0005 | - | ○ |
| | OTHER INFORMATION | ○ | - |

(52) U.S. Cl.
CPC .......... *G06F 3/1225* (2013.01); *G06F 3/1247* (2013.01); *G06F 3/1232* (2013.01); *G06F 3/1255* (2013.01)

(56) References Cited

U.S. PATENT DOCUMENTS

| | | | | |
|---|---|---|---|---|
| 2009/0086265 A1* | 4/2009 | Toda | ..................... | G06F 3/1215 358/1.15 |
| 2014/0192376 A1* | 7/2014 | Morimoto | ............... | G06F 3/121 358/1.13 |
| 2018/0067704 A1* | 3/2018 | Kobayashi | ............ | G06F 3/1205 |

OTHER PUBLICATIONS

Jun. 21, 2018—U.S. Co-pending U.S. Appl. No. 16/014,035.
Jun. 11, 2019—U.S. Notice of Allowance—U.S. Appl. No. 16/014,035.

* cited by examiner

FIG. 5

| ITEM | SETTING INFORMATION | FIRST DRAWING FUNCTION IS RECOMMENDED | FIRST DRAWING FUNCTION IS DEPRECATED |
|---|---|---|---|
| PRINT RESOLUTION | 1200 dpi | ○ | — |
| | 600 dpi | ○ | — |
| | 300 dpi | — | ○ |
| SHEET TYPE | NORMAL SHEET | ○ | — |
| | THICK SHEET | ○ | — |
| | INKJET SHEET | — | ○ |
| | GLOSSY SHEET | — | ○ |
| DOCUMENT TYPE | TEXT | ○ | — |
| | GRAPH | ○ | — |
| | PHOTOGRAPH | — | ○ |
| COLOR DESINGATION INFORMATION | 0 × 0000 | — | ○ |
| | 0 × 0001 | — | ○ |
| | 0 × 0005 | — | ○ |
| | OTHER INFORMATION | ○ | — |

INFORMATION PROCESSING APPARATUS, AND NON-TRANSITORY COMPUTER-READABLE MEDIUM STORING INSTRUCTION THEREFOR

CROSS-REFERENCE TO RELATED APPLICATIONS

This application claims priority under 35 U.S.C. § 119 from Japanese Patent Application No. 2017-188346 filed on Sep. 28, 2017. The entire subject matter of the application is incorporated herein by reference.

BACKGROUND

Technical Field

The present disclosures relates to an information processing apparatus and a non-transitory computer-readable recording medium storing instructions to control the information processing apparatus.

Related Art

Generally, a printer driver is installed in an information processing apparatus to control a printer connected to the information processing apparatus. The printer driver is typically implemented with drawing functions for executing a drawing process.

SUMMARY

A printer driver is implemented with a plurality of drawing functions. From among such functions, necessary drawing functions are designated by an OS depending on a condition so that the drawing process is appropriately executed. It is noted, however, there could be a case where it is preferable that a particular drawing process is not executed by the OS.

According to aspects of the present disclosures, there is provided a non-transitory computer-readable medium for an information processing apparatus having a communication interface and a controller, the communication interface being configured to communicate with a printer, an operating system being installed in the information processing apparatus. The non-transitory computer readable recording medium storing instructions realizing a printer driver causing, when executed, the controller to execute outputting driver-executable information indicating a driver-executable drawing process executable by the printer driver from among a plurality of drawing processes designatable by an operating system installed in the information processing apparatus to the operating system, the operating system being configured to instruct the printer driver to execute the driver-executable drawing process indicated by the driver-executable information as output from among the plurality of drawing processes when a print instruction using the printer driver is received from an application installed in the information processing apparatus, determining whether a particular condition corresponding to a particular driver-executable drawing process of the driver-executable drawing process is satisfied, outputting driver-executable process information indicating the driver-executable drawing process including the particular driver-executable drawing process to the operating system when it is determined that the particular condition is satisfied, and outputting the driver-executable process information which does not include the particular driver-executable condition to the operating system when it is determined that the particular condition is not satisfied.

According to aspects of the present disclosures, there is provided an information processing apparatus having a controller, an operating system and a printer driver being installed in the information processing apparatus. The controller is configured to executes, by executing the printer driver, outputting driver-executable information indicating a driver-executable drawing process executable by the printer driver from among a plurality of drawing processes which can be instructed by the operating system to the operating system, the operating system being configured to instruct the printer driver to execute the driver-executable drawing process indicated by the driver-executable information as output from among the plurality of drawing processes when a print instruction using the printer driver is received from an application installed in the information processing apparatus, determining whether a particular condition corresponding to a particular driver-executable drawing process of the driver-executable drawing process is satisfied, outputting driver-executable process information indicating the driver-executable drawing process including the particular driver-executable drawing process to the operating system when it is determined that the particular condition is satisfied, and outputting the driver-executable process information which does not include the particular driver-executable condition to the operating system when it is determined that the particular condition is not satisfied.

BRIEF DESCRIPTION OF THE ACCOMPANYING DRAWINGS

FIG. 1 is a block diagram of a printer system 1 according to an illustrative embodiment of the present disclosures.

FIGS. 2A and 2B schematically illustrate a repetitive drawing process according to the illustrative embodiment.

FIGS. 3A-3F schematically illustrate a ROP process according to the illustrative embodiment.

FIG. 5 shows data structure of map data.

DETAILED DESCRIPTION OF THE EMBODIMENT

<Configuration of Printer System>

Figure 1:
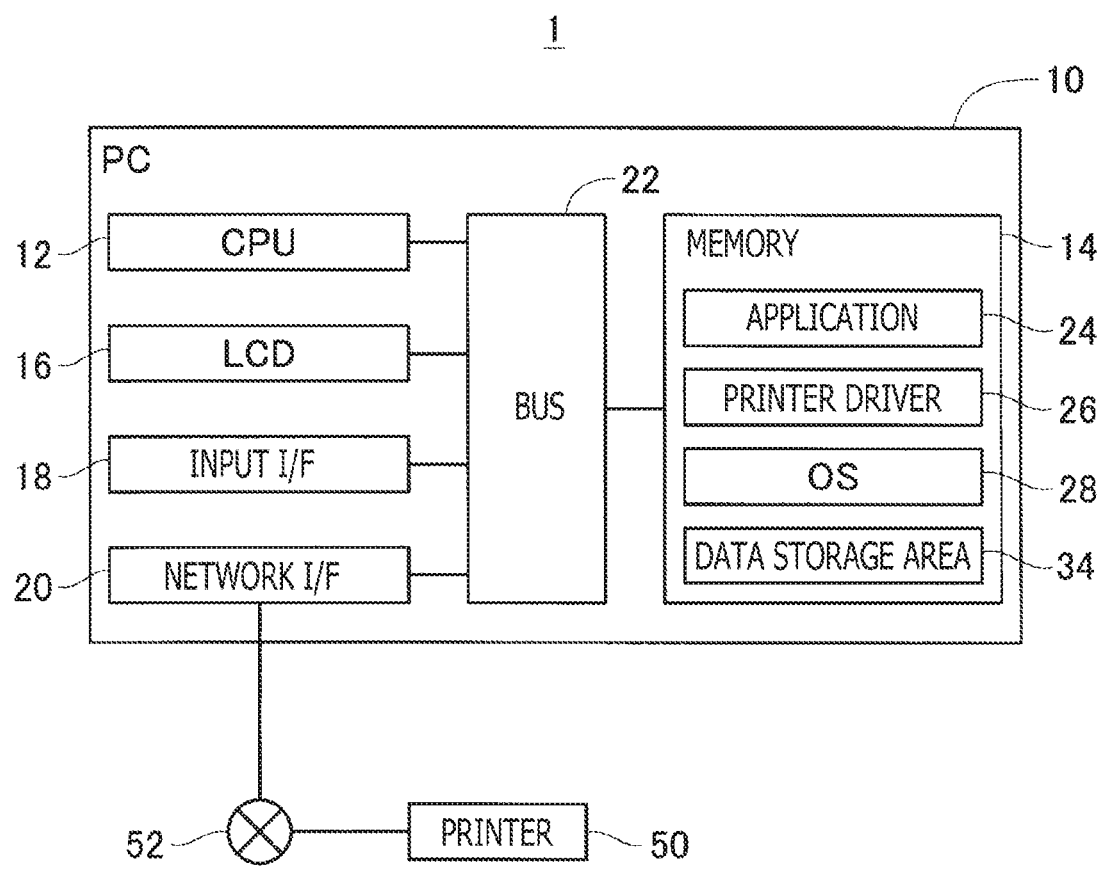
Figure 2A:
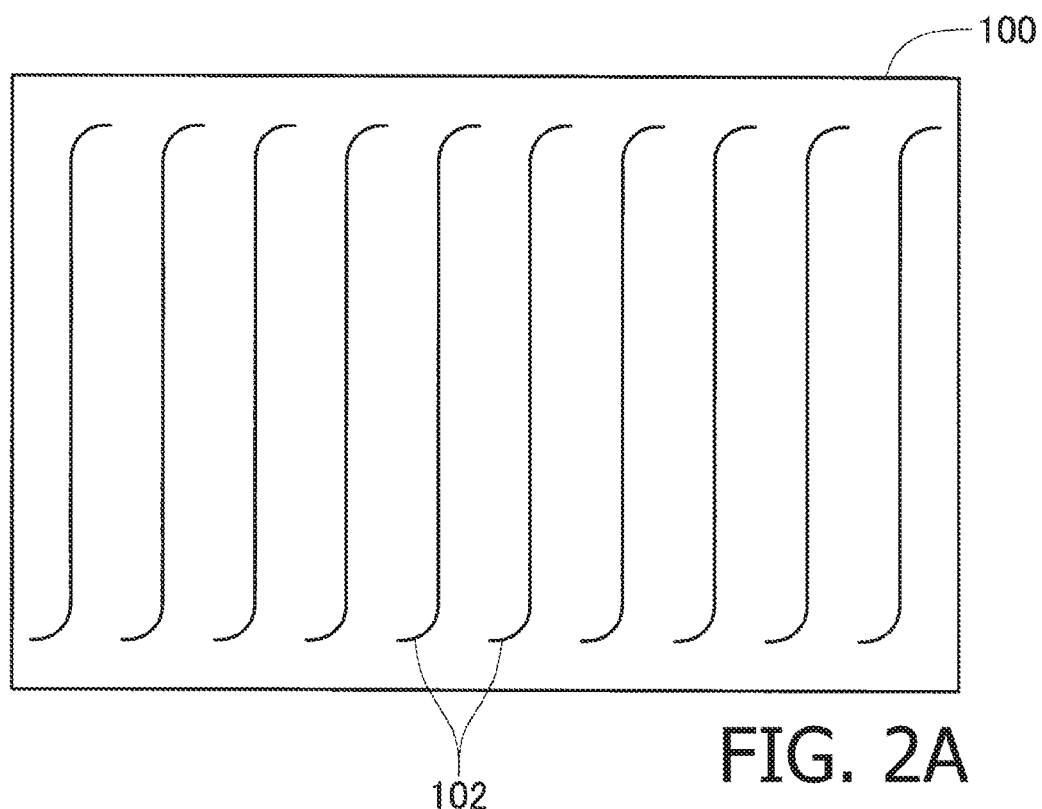
Figure 2B:
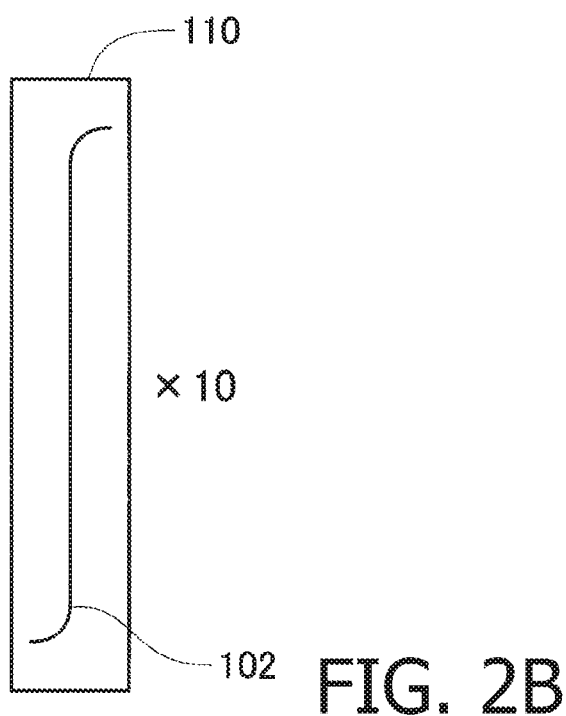

FIG. 1 is a block diagram of a printer system 1 according to an illustrative embodiment of the present disclosure. The printer system 1 shown in FIG. 1 has a PC (an example of an information processing apparatus) 10 and a printer 50. The PC 10 mainly has a CPU (an example of a computer and a controller) 12, a memory 14, an LCD (an example of a display) 16, an input I/F (an example of a user interface) 18 and a network I/F (an example of a communication interface) 20. The above-described components of the PC are interconnected through a bus 22 so as to be communicatable with each other.

The PC 10 and the printer 50 are configured to communicate with each other through the network I/F 20 and a network 52. As a communication method, one using a wired LAN, a USB, the Wi-Fi (registered trademark) or the Bluetooth® may be employed.

The CPU 12 executes various processes in accordance with applications 24, a printer driver 26 and an OS 28. The applications 24 include programs used to create contents such as word processing software used for creating a document content, a-spreadsheet software used for creating a spreadsheet content and presentation software used to create presentation content. The contents created by the applications 24 are printed by the printer 50 connected to the PC 10 as the respective applications 24 instruct the OS 28 to print the same. When an application 24 instructs the OS 28 to print the content, the applications 24 output content data representing the content to be printed in a format which the OS 28 is capable of interpreting.

In this regard, in the following description, the contents data the application 24 transmits to the OS 28 will be described as a kind of image data. The printer driver 26 is a device driver of the printer 50, and controls, when executed by the CPU 12, operations of the printer 50. The OS 28 is a program presenting basic functions which will be used by the applications 24 and the printer driver 26. That is, the OS 28 is an operating system such as Windows®, Mac OS®, Linux®, Android®, iOS® and the like.

It is noted that, in the following description, the CPU 12 executing an application will occasionally be referred to by the name of the application. For example, the CPU 12 executing the printer driver 26 (i.e., causing the printer driver 26 to control the printer 50) to perform a printing process will occasionally be described such that the printer driver 26 executes the printing process.

The memory 14 has a data storage area 34. The data storage area 34 is an area configured to store data necessary to execute the printer driver 26 and the like. It is noted that the memory 14 is configured as a combination of a RAM, a ROM, a flash memory, an HDD and a buffer provided to the CPU 12 or the like.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various functions of the PC 10. The input I/F 18 is an interface enabling a user to input a user operation, and includes a keyboard and a mouse therefor.

<Printing Process by Printer System>

The printer driver 26 is for controlling an operation of the printer 50, and specifications for drawing processes executable by the printer driver 26 (hereinafter, referred to as driver-executable drawing processes) are defined by a vendor of the OS 28. It is noted that, for all the drawing processes defined by the vendor, the OS 28 has functions of instructing the printer driver 26 to execute the drawing processes. Incidentally, the printer drive 26 is to be developed by a vendor of the printer 50. Therefore, regarding the driver-executable drawing processes the printer driver 26 is to deal with, outlines of instructions (i.e., a relationship between the drawing processes designated by drawing instructions and images drawn as a result of instructions) are defined by the vendor of the OS 28. Further, the OS 28 has OS standard drawing functions for executing the drawing processes. It is noted that the drawing process is a process of creating image data for drawing an image on a printing medium (i.e., image data for printing), and a process of printing the image represented by the thus created image data on the printing medium will be referred to as the drawing process.

Further, the vendor of the printer 50 self-develops the printer driver 26 which is provided with the drawing functions for executing the drawing processes so as to be suitable to the printer 50. As a result, in the PC 10 in which the printer drive 26 and the OS 28 are installed, for one drawing process which the OS 28 is capable of instructing, there exists a drawing function provided to the printer driver 26 and a OS standard drawing function provided to the OS 28. Since the printer driver 26 is designed to be suitable for characteristics of the printer 50 and/or user's requirements, depending on settings of the drawing processes, there could be cases in which (1) processing efficiency is relatively good or not so good and/or (2) quality of drawn image is relatively good or not so good.

Therefore, according to the printer system 1, the drawing process is executed using the drawing function in accordance with various conditions by selecting from among the drawing functions provided to the printer driver 26 and the OS standard drawing functions provided to the OS 28. Hereinafter, operations of the printer system 1 when the drawing processes are executed using drawing functions in accordance with various conditions will be described.

It is noted that, in the following description, processes of the CPU 12 in accordance with instructions scripted in programs are basically indicated. Processes indicated by terms "determine", "extract", "select", "calculate", "judge", "identify", "obtain", "receive", "control", and "set" are the processes of the CPU 12. It is noted that the processes executed by the CPU 12 include a hardware control through the OS 28. It is further noted that the term "obtain" will be used to mean a concept in which a request is not necessary. That is, a process in which the CPU 12 receives data without requesting the same is included in a concept that the CPU 12 obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Alternatively, the terms "instruct", "respond" and "request" may be used to mean the information indicating the "instruct", "respond" and "request", respectively.

Firstly, in accordance with input of user operations through the input I/F 18 of the PC 10, the application 24 instructs the OS 28 to print the image data created by the application 24. At this stage, the user operates the input I/F 18 to set a print condition. Concretely, the print condition includes, for example, a print resolution, a type of printing sheets (sheet type), and document types of print objects. According to the present embodiment, the print resolution of the printer 50 can be set to one of 300 dpi, 600 dpi and 1200 dpi. The sheet type of the printer 50 can be set to one of a normal sheet, a thick sheet, an inkjet sheet and a glossy sheet. The document type can be set to one of a text, a graph and a photograph. When the application 24 creates image data, the application 24 transmits the created image data, and information regarding the set print conditions (hereinafter, referred to as condition information) to the OS 28.

When receiving the image data, the OS 28 transmits an execution instruction of the drawing process of the image based on the image data by designating a drawing process which can be processed by the printer driver 26 (i.e., the driver-executable drawing process). If the OS 28 recognizes the driver-executable drawing processes corresponding to the printer driver 26, the OS 28 can instruct the printer driver 26 to execute an appropriate driver-executable drawing process. Therefore, the OS 28 transmits an inquiry for the driver-executable drawing processes to the printer driver 26. Concretely, the OS 28 calls a function DrvEnableSurface of the printer driver 26.

When the OS 28 calls the function DrvEnableSurface, the printer driver 26 transmits information indicating the driver-executable drawing process (i.e., driver-executable information) to the OS 28. Concretely, the printer driver 26 designates the driver-executable drawing process as a flag, and designates the flag as an argument of the function EngAssociateSurface. Then, by executing the function EngAssociateSurface, the printer driver 26 notifies information concerning the driver-executable drawing process to the OS 28. For example, when the function EngAssociateSurface is executed with using flags HOOK_BITBLT and HOOK_STRETCHBLTROP as arguments thereof, it is notified to the OS 28 that the printer driver 26 is capable of dealing with two kinds of drawing processes: (1) a drawing process using a function DrvBitBlt, and (2) a drawing process using a function DrvStretchBltROP (which is an example of a particular driver-executable drawing function).

Therefore, when the OS 28 receives a notification using the above functions, the OS 28 recognizes that the printer driver 26 is capable of executing the drawing process using the function DrvBitBlt and the drawing process using the function DrvStretchBltROP. Then, the OS 28 executes the drawing process using the function DrvBitBlt of the printer driver 26 or the drawing process using the function DrvStretchBltROP of the printer driver 26. It is noted that, in the embodiment, only two functions are indicated as examples for brevity, there are much more drawing processes the OS 28 can instruct the printer driver 26 to execute. It is also noted that the printer driver 26 may be configured to correspond to more than two functions which are indicated above as examples.

The drawing process using the function DrvBitBlt is a drawing process based on bit-map format image data in which color data is designated for each of coordinates of the print object image. In the following description, such bit-map format image data will be referred to as all-pixel designated image data. Thus, when the drawing process using the function DrvBitBlt is instructed to be executed, the OS 28 creates the all-pixel designated image data based on the image data received from the application 24. Then, the OS 28 executes the function DrvBitBlt of the printer driver 26 with setting the all-pixel designated image data to the argument as the drawing object. It is noted that, in the arguments of the function DrvBitBlt, condition information is also included in addition to the all-pixel designated image data.

The drawing process using the function DrvStretchBltROP is a drawing process in which a repetitive drawing process and a ROP (raster operation) process can be executed. The repetitive drawing process is a process of receiving a drawing range and an image area as input, and fill the designated drawing range with the image. For example, when a range equivalent to an area of a final drawing result of an image 100 is designated as the drawing range, and a bit-map format image data in which color data for respective coordinates of a divided image 110 (hereinafter, referred to as partial-pixel designated image data) is designated as the image with which the drawing range is filled, the OS 28 executes a process of filling the designated drawing range with a plurality of divided images 110. As a result of the above process, the image 100 is formed.

When the drawing process using the function DrvStretchBltROP is to be executed, the OS 28 includes information indicating an execution instruction of the repetitive drawing process (hereinafter, referred to as repetitive drawing process execution information) in the arguments of the function DrvStretchBltROP. That is, the repetitive drawing process execution information indicating (1) the partial-pixel designated image data, and (2) repetition of drawing of an image based on the partial-pixel designated image data are included in the arguments of the function DrvStretchBltROP. In other words, the OS 28 calls the function DrvStretchBltROP having the repetitive drawing process execution information in its arguments. It is noted that the arguments of the function DrvStretchBltROP include the condition information in addition to the repetitive drawing process execution information.

Figure 3A:
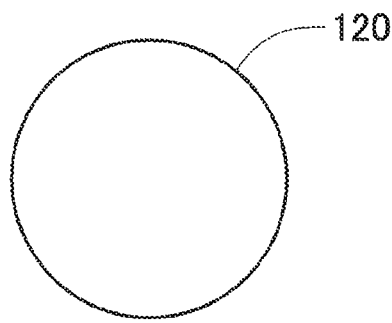
Figure 3B:
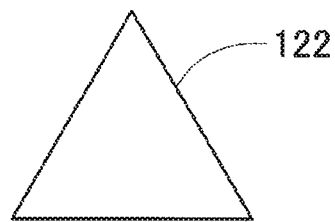
Figure 3C:
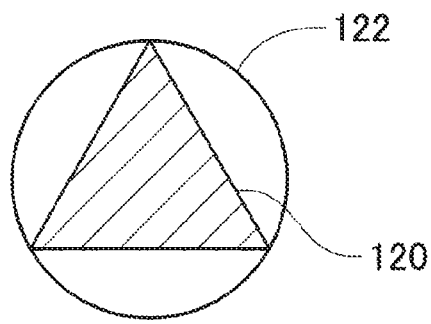
Figure 3D:
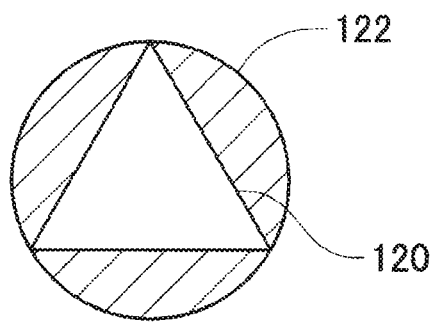
Figure 3E:
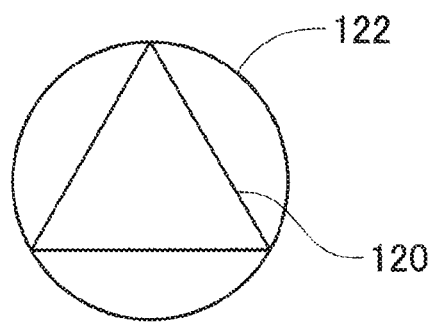
Figure 3F:
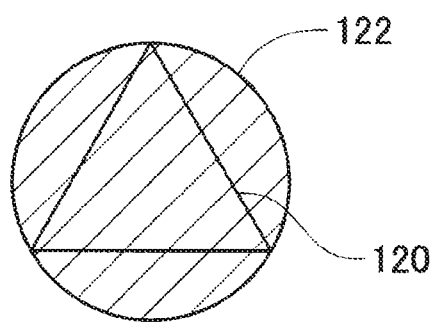

The ROP process is a process of drawing a plurality of images in a synthesized manner. As an example, a case where an image 120 shown in FIG. 3A and an image 122 shown in FIG. 3B are synthesized and drawn will be described. The ROP process is a process of drawing an image by synthesizing a plurality of images, and an inner part of each image is designated to be white or black. Therefore, in a synthesized image of FIG. 3C, a portion where the image 120 and the image 122 overlap (hereinafter, referred to as an overlapped portion) is designated to be black, while the remaining portion (a portion except for the overlapped portion) is designated to be white. In a synthetic image shown in FIG. 3D, the overlapped portion is designated to be white, while the remaining portion is designated to be black. In a synthetic image of FIG. 3E, the overlapped portion is designated to be white, and the remaining portion is also designated to be white. In a synthetic image of FIG. 3F, the overlapped portion is designated to be black, and the remaining portion is also designated to be black. Thus, there are four patterns to designate the color inside the synthesized image when the image 120 and the image 122 are synthesized, and as the synthesized images, there are four images as shown in FIGS. 3C-3F can be drawn.

When the drawing process using the function DrvStretchBltROP is designated, the OS 28 includes information indicating an execution instruction of the ROP (hereinafter, referred to as an ROP process execution information) in the arguments of the function DrvStretchBltROP. The ROP process execution information includes the image data of the image 120, the image data of the image 122 and information designating the inside if the synthesized image (hereinafter, referred to as image color designation information). The OS 28 calls the function DrvStretchBltROP with designating the ROP process execution information as the argument. It is noted that, in the function DrvStretchBltROP, the condition information is included in addition to the ROP process execution information.

When the OS 28 designates the drawing process using the function DrvBitBlt, the all-pixel designated image data created by the OS 28 is output to the printer driver 26. Then, the printer driver 26 creates the all-pixel designated image data for printing, which is the image data having a format printable by the printer 50, based on the all-pixel designated image data received from the OS 28, and transmits the thus created all-pixel designated image data for printing to the printer 50. Consequently, the printing process based on the all-pixel designated image data is executed by the printer 50. It is noted that the image data for printing may be raster image data or vector image data as far as the printer 50 can print the same. Further, the image data for printing may be image data including header data instructing the print settings to the printer 50.

However, since the all-pixel designated image data is image data in which color data for every coordinate of the image subject to be printed is designated, an amount of the image data becomes relatively large. If a capacity of a data storage of the printer 50 is relatively small, it is not preferable to execute the printing process based on the image data of which data amount is relatively large. Further, when the printing process is executed using the image data of which data amount is large, a printing speed is lowered and a time period necessary for printing is elongated.

When the OS 28 designates the drawing process using the function DrvStretchBltROP, the printer driver 26 creates the image data of printing based on the partial-pixel designated image data, the repetitive drawing process execution information and the ROP process execution information included in the function. Then, the printer driver 26 transmits information designating the number of times of drawing the image based on the partial-pixel designated image data (hereinafter, referred to as frequency information) together with the partial-pixel designated image data. Consequently, the printing process based on the partial-pixel designated image data is executed by the printer 50.

Further, the printer driver 26 transmits an execution command of the ROP process to the printer 50 in accordance with the ROP process execution information included in the function. Then, the printing process based on the ROP process execution command is executed by the printer 50.

As described above, when the drawing process using the function DrvStretchBltROP is used, the printer 50 executes the printing process based on the partial-pixel designated image data or an image synthesizing process command. Since the partial-pixel designated image data is the image data of a divided image, which is a divided part of the image subject to be printed, the amount of data is small in comparison with the all-pixel designated image data. Since the image synthesizing process command and the image data for synthesizing includes the image data of the image 120, the image data of the image 122 and information instructing the inside color of the image in accordance with the image color designation information, the amount of data is also small in comparison with the all-pixel designated image data. Accordingly, when the OS 28 designated the drawing process using the function DrvStretchBltROP, issues of the storage capacity of the printer 50, the lowering of printing speed and the like can be resolved.

However, when the drawing process using the function DrvStretchBltROP is designated, since the printer 50 executed the printing process of the image based on the partial-pixel designated image data or the image synthesizing process command, the process executed by the printer 50 is complicated. That is, when the printing process based on the partial-pixel designated image data is executed, it is necessary that the printer 50 executes the printing process of the image based on the partial-pixel designated image data by the number corresponding to the frequency information of times. When the printing process based on the image synthesizing process command is executed, it is necessary that the printer 50 analyzes the information designating the inside color of the image, and executes color coding inside the image based on the analysis. Therefore, when the performance of the CPU of the printer 50 is relatively low, there could be a case where a time period necessary for the printing process of the image based on the partial-pixel designated image data or the image synthesizing process command is longer than the time period for the printing process of the image based on the all-pixel designated image data. That is, there could be a case where designating the drawing process using the function DrvBitBlt is more preferable than designating the drawing process using the function DrvStretchBltROP.

As described above, depending on situations, designating the drawing process using the function DrvStretchBltROP may be more preferable, or designating the drawing process using the function DrvBitBlt may be more preferable. In view of the above, in the PC 10, in order the drawing process using appropriate drawing functions corresponding to various situations, the printer drive 26 determines, based on the various situations, whether a flag indicating the drawing process using the function DrvStretchBltROP is output to the OS 28. That is, the printer driver 26 determines whether a flag HOOK_STRETCHBLTROP representing the drawing process using the function DrvStretchBltROP is to be included in the function EngAssociateSurface.

Figure 4:
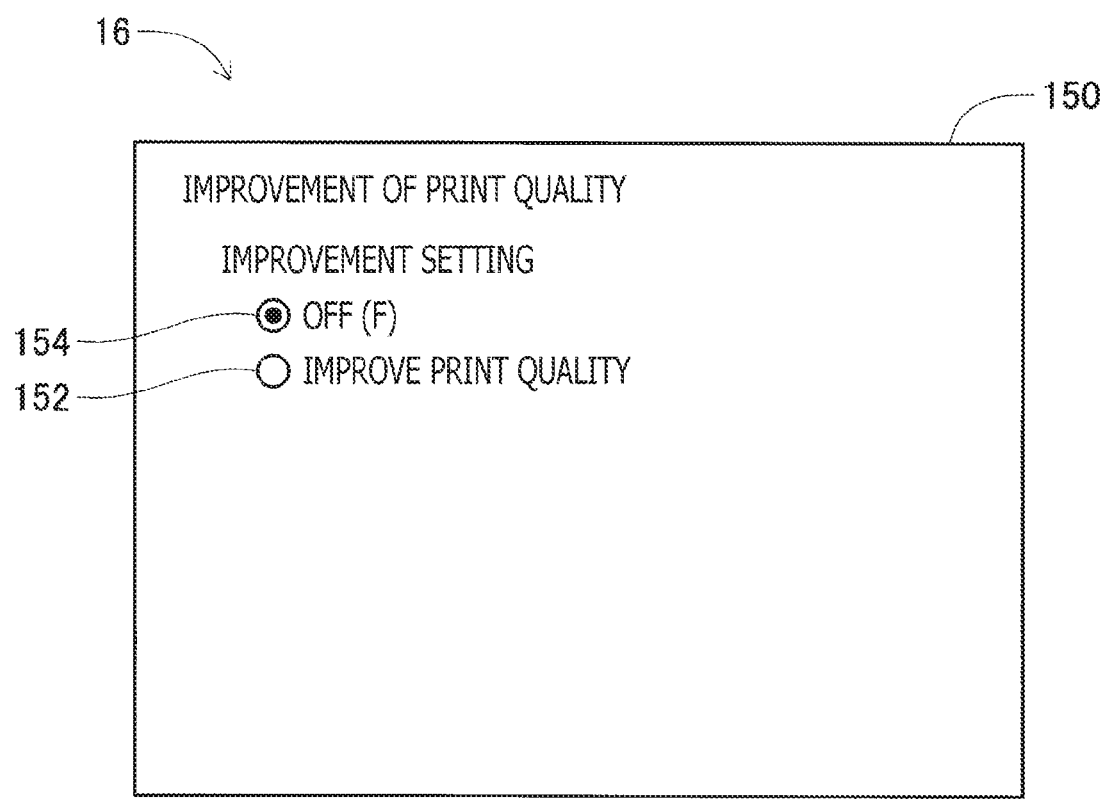
FIG. 4 is an example of a print quality improvement screen.

Concretely, in the PC 10, in response to a particular operation with respect to the input I/F 18, the printer driver 26 displays a print improvement screen (which is an example of an operation screen) 150 as shown in FIG. 4 on the LCD 16. The print improvement screen 150 is a screen allowing the user to select an option to improve the printing process of the image based on the image data created by the application 24. On the print improvement screen 150, an improvement button (setting button) 152 to select an option of setting the improvement in the printing process, and an off button (non-setting button) 154 to select an option of not setting the improvement in the printing process. When the setting button 152 is operated, the printer driver 26 sets an improvement flag (which is an example of determination information) to be ON, and stores the improvement flag in the data storage area 34. When the non-setting button 154 is operated, the printer driver 26 sets the improvement flag to be OFF, and stores the improvement flag in the data storage area 34.

When the OS 28 calls the function DrvEnableSurface, that is, when the printer drive 26 receives an inquiry of the driver-executable drawing process from the OS 28, the printer driver 26 obtains the improvement flag from the data storage area 34, and determines whether the improvement flag is set to ON or OFF. When the improvement flag is set to OFF, the printer driver 26 determines that a flag indicating the drawing process using the function DrvStretchBltROP is to be output to the OS 28. When the improvement flag is set to ON, the printer driver 26 determines that a flag indicating the drawing process using the function DrvStretchBltROP is not to be output to the OS 28. That is, when the improvement flag is set to OFF, the printer driver 26 includes the flag HOOK_STRETCHBLTROP indicating the drawing process using the function DrvStretchBltROP in the function EngAssociateSurface, and executes the function EngAssociateSurface. On the other hand, when the improvement flag is set to ON, the printer driver 26 does not include the flag HOOK_STRECHBLTROP indicating the drawing process using the function DrvStretchBltROP in the function EngAssociateSurface, and executes the function EngAssociateSurface.

Therefore, when the improvement flag is set to OFF, the OS 28 can designate the drawing process using the function DrvStretchBltROP. On the other hand, when the improvement flag is set to ON, the OS 28 cannot designate the drawing process using the function DrvStretchBltROP, and designate the drawing process using the function DrvBitBlt. That is, when the improvement flag is set to OFF, the printer 50 executes the printing process of the image based on the partial-pixel designated image data or the image synthesizing process command. When the improvement flag is set to ON, the printer 50 executes the printing process of the image based on the all-pixel designated image data. In the printing process of the image based on the partial-pixel designated image data or the image synthesizing process command, as described above, a relatively complicated process is executed, and there are concerns, although a little, that the performance of the printing process is lowered. In contrast, in the printing process of the image based on the all-pixel designated image data, there are a little complicated processes, there are little concerns that the performance of the printing process is lowered, and it is ensured that the appropriate printing process is ensured. Therefore, when the user wishes that the printing process is improved (e.g., the printing quality is improved), the printing process of the image based on the partial-pixel designated image data or the image synthesizing process command is prohibited, while the printing process of the image based on the all-pixel designated image data is allowed, thereby the printing process being improved.

In the data storage area 34, information indicating whether or not execution of the printing process of the image is recommended based on the partial-pixel designated image data or the image synthesizing process command in the printer 50 (hereinafter, the information will be referred to as recommendation information, which is an example of determination information and storage information) is stored. When an installer of the printer driver 26 installs the printer driver 26 in the PC 10, the installer also stores the recommendation information in the data storage area 34. Alternatively, the printer driver 26 installed in the PC 10 may obtain the recommendation information from the printer 50 and store the thus obtained recommendation information in the data storage area 34. Further alternatively, the printer driver 26 may obtain the recommendation information from a homepage of the vendor of the printer driver 26, and store the thus obtained recommendation information in the data storage area 34. Still alternatively, when the printer driver 26 is executed, the printer driver 26 may store the recommendation information, which has been programmed in advance in execution codes of the printer driver 26, in the data storage area 34. It is noted that map data, which will be described later, may be stored in the data storage area 34 in accordance with the same method as the recommendation information is stored in the data storage area 34.

When the printer drive 26 receives inquiry of the driver-executable drawing process from the OS 28, the printer driver 28 retrieves the recommendation information from the data storage area 34. When the retrieved recommendation information recommends execution of the printing process of the image based on neither the partial-pixel designated image data nor the image synthesizing process command, the printer driver 26 executes the function EngAssociateSurface without including the flag HOOK_STRETCHBLTROP indicating the drawing process using the function DrvStretchBltROP, and notifies the OS 28 of information concerning the driver-executable drawing process. On the other hand, when the recommendation information recommends execution of the printing process of the image based on the partial-pixel designated image data or the image synthesizing process command, the printer driver 26 includes the flag HOOK_STRECHBLTROP indicating the drawing process using the function DrvStretchBltROP in the function EngAssociateSurface, executes the function EngAssociateSurface, and notifies the OS 28 of information concerning the driver-executable drawing process.

It is noted that a processing power of the CPU of the printer 50 is not dynamically varied, but determined uniquely for each model of the printer 50. Therefore, whether or not the printer 50 has the CPU having a sufficient processing power to preferably execute the printing process of the image based on the partial-pixel designated image data or the image synthesizing process command can be known at a time of development of the printer 50. Accordingly, the recommendation information is provided, in advance, to the printer driver 26 or the printer 50. When the recommendation information recommends execution of the printing process of the image based on the partial-pixel designated image data or the image synthesizing process command, the flag HOOK_STRETCHBLTROP indicating the drawing process using the function DrvStretchBltROP is included in the function EngAssociateSurface. In contrast, when the recommendation information does not recommend execution of the printing process of the image based on either the partial-pixel designated image data or the image synthesizing process command, the flag HOOK_STRETCHBLTROP indicating the drawing process using the function DrvStretchBltROP is not included in the function EngAssociateSurface.

Therefore, only in the printer provided with the CPU capable of preferably executing the printing process of the image based on the partial-pixel designated image data or the image synthesizing process command, execution of the printing process of the image based on the partial-pixel designated image data or the image synthesizing process command is allowed. In contrast, in the printer provided with the CPU which is incapable of preferably executing the printing process of the image based on either the partial-pixel designated image data or the image synthesizing process command, execution of the printing process of the image based on the partial-pixel designated image data or the image synthesizing process command is prohibited, but the printing process of the image based on the all-pixel designated image data is permitted. According to the above configuration, it is possible to cause the printer 50 to execute the printing process corresponding to the performance of the CPU and the like of the printer 50.

It is noted that the printer 50 is configured to be set to a mode to lower the speed of the printing process (hereinafter, referred to as a low process speed mode) in order to reduce noises which are generated when the printing process is being executed. When the operation mode of the printer 50 is set to the low process speed mode, the user recognizes that the printing speed is lowered. Therefore, in such a case, necessity to daringly execute the printing process of the image based on the partial-pixel designated image data or the image synthesizing process command is low. Accordingly, when the low process speed mode is set in the printer 50, the flag HOOK_STRETCHBLTROP indicating the drawing process using the function DrvStretchBltROP is not included in the function EngAssociateSurface.

Concretely, when the printer driver 26 receives the inquiry of the driver-executable drawing process from the OS 28, the printer driver 26 communicates with the printer 50 and determines whether the printer 50 is set to the low process speed mode (which is an example of determination information, printer characteristic information). When the printer 50 is set to the low process speed mode, the printer driver 26 executes the function EngAssociateSurface without including the flag HOOK_STRETCHBLTROP indicating the drawing process using the function DrvStretchBltROP in the function EngAssociateSurface, and notifies the OS 28 of information concerning the driver-executable drawing process. On the other hand, when the printer 50 is not set to the low process speed mode, the printer driver 26 executes the function EngAssociateSurface including the flag HOOK_STRETCHBLTROP indicating the drawing process using the function DrvStretchBltROP in the function EngAssociateSurface, and notifies the OS 28 of information concerning the driver-executable drawing process. According to the above configuration, in a situation where speed-up of the printing process is not desired, execution of the printing process of the image based on the partial-pixel designated image data or the image synthesizing process command is suppressed.

When the printing process of the image based on the all-pixel designated image data is executed, the data amount of the image data transmitted from the PC 10 to the printer 50 is relatively large. Therefore, in order to execute the printing process of the image based on the all-pixel designated image data, the storage capacity of the printer 50 needs to be a particular (sufficient) amount. Accordingly, when the printer driver 26 receives the inquiry of the driver-executable drawing process from the OS 28, the printer driver 26 communicates with the printer 50 and obtains information indicating the available capacity of the memory (hereinafter, referred to as available capacity information, which is an example of determination information, printer status information, and available capacity information) of the printer 50. Then, the printer driver 26 determines whether or not the available capacity of the memory of the printer 50 indicated by the available capacity information is equal to a threshold value.

In this case, when the available capacity of the memory of the printer 50 is equal to or larger than the threshold value, that is, when the available capacity of the memory of the printer 50 is included in a range equal to or larger than the threshold value, the printer driver 26 does not include the flag HOOK_STRETCHBLTROP indicating the drawing process using the function DrvStretchBltROP in the function EngAssociateSurface. On the other hand, when the available capacity of the memory of the printer 50 is less than the threshold value, that is, when the available capacity of the memory of the printer 50 is included in a range less than the threshold value, the printer driver 26 includes the flag HOOK_STRETCHBLTROP indicating the drawing process using the function DrvStretchBltROP in the function EngAssociateSurface. Accordingly, when the available capacity of the memory of the printer 50 is equal to or larger than the threshold value, execution of the drawing process using the function DrvStretchBltROP is prohibited, while execution of the drawing process using the function DrvBitBlt is allowed. On the other hand, when the available capacity of the memory of the printer 50 is less than the threshold value, execution of the drawing process using the function DrvStretchBltROP is allowed. According to the above configuration, when the available capacity of the memory of the printer 50 is relatively small, the printing process based on the partial-pixel designated image data or the image synthesizing process command, namely, the image data of which data amount is relatively small can be executed.

There are cases where the speed of the printing process of the printer 50 is relatively slow due to structural factors of the printer 50. For example, there are cases where the speed of the printing process of the printer 50 becomes relatively slow due to the performance of devices which affect the speed of the printing process of the printer 50 (e.g., an conveying speed of a conveying device to convey printing sheets or an operation speed of an inkjet head to eject ink to the printing sheets when the printer is an inkjet printer). In such a case, since an upper limit of the speed of the printing process is relatively low, even if the printing process based on the partial-pixel designated image data or the image synthesizing process command is executed, the speed of the printing process may not become so high. Thus, in such a case, the necessity of daringly executing the printing process of the image based on the partial-pixel designated image data or the image synthesizing process command is low. Accordingly, when the speed of the printing process of the printer 50 is slow due to the structural factors of the printer 50, the flag HOOK_STRETCHBLTROP indicating the drawing process using the function DrvStretchBltROP is not included in the function EngAssociateSurface.

Concretely, when the printer driver 26 receives the inquiry of the driver-executable drawing process from the OS 28, the printer driver 26 communicates with the printer 50 and obtains information representing performance value(s) of the devices which affect the speed of the printing process of the printer 50 (hereinafter, referred to as performance information, which is an example of determination information, processing performance information) from the printer 50. It is noted that the performance information includes the conveying speed of the printing sheets of the conveying device of the printer 50, the ink ejection speed of the inkjet head and the like. After obtaining the performance information from the printer 50, the printer driver 26 determines whether or not the performance value represented by the performance information is equal to or larger than a threshold value.

In this case, when the performance value indicated by the performance information is equal to or larger than the threshold value, that is, when the performance value is included in a range equal to or larger than the threshold value, the printer driver 26 includes the flag HOOK_STRETCHBLTROP indicating the drawing process using the function DrvStretchBltROP in the function EngAssociateSurface. On the other hand, when the performance value indicated by the performance information less than the threshold value, that is, when the performance value is included in a range less than the threshold value, the printer driver 26 does not include the flag HOOK_STRETCHBLTROP indicating the drawing process using the function DrvStretchBltROP in the function EngAssociateSurface. That is, when the speed of the printing process of the printer 50 is relatively slow, execution of the drawing process using the function DrvStretchBltROP is prohibited, while execution of the drawing process using the function DrvBitBlt is allowed. In contrast, when the speed of the printing process of the printer 50 is relatively fast, execution of the drawing process using the function DrvStretchBltROP is allowed.

According to the above configuration, when speed-up of the printing process cannot be achieved even if the printing process based on the partial-pixel designated image data or the image synthesizing process command is executed, execution of the printing process based on the partial-pixel designated image data or the image synthesizing process command is prohibited. Further, only when speed-up of the printing process can be achieved by executing the printing process based on the partial-pixel designated image data or the image synthesizing process command, execution of the printing process based on the partial-pixel designated image data or the image synthesizing process command is allowed.

As described above, in the PC 10, the printer driver 26 determines whether or not the flag HOOK_STRETCHBL-TROP indicating the drawing process using the function DrvStretchBltROP is to be included in the function EngAssociateSurface based on various situations. When the printer driver 26 determines that it is preferable the OS 28 designates the drawing process using the function DrvStretchBltROP, the printer driver 26 includes the flag HOOK_STRETCHBLTROP indicating the drawing process using the function DrvStretchBltROP in the function EngAssociateSurface. On the other hand, when the printer driver 26 determines that it is preferable the OS 28 designates the drawing process using the function DrvBitBlt, the printer driver 26 does not include the flag HOOK_STRETCHBL-TROP indicating the drawing process using the function DrvStretchBltROP in the function EngAssociateSurface. Accordingly, the OS 28 is capable of designating the drawing processes suitable to the various situations, respectively.

Further, when the printer driver 26 includes the flag HOOK_STRETCHBLTROP indicating the drawing process using the function DrvStretchBltROP in the function EngAssociateSurface, and executes the function EngAssociateSurface to notify the OS 28 of information concerning the driver-executable drawing process, the OS 28 executes the drawing process using the function DrvStretchBltROP. In such a case, the printer driver 26 determines whether or not the dragging process using the function DrvStretchBltROP is executed in accordance with various situations so that the drawing process can be executed using the drawing functions corresponding to the various situations, respectively.

Concretely, when the OS 28 executes the function DrvStretchBltROP, the printer driver 26 extracts condition information or image color designation information included in the function DrvStretchBltROP. The condition information includes, as described above, the print condition which was set when the image is created by the application 24, that is, the condition information includes information of the print resolution, the type of the printing sheet, and the document type of the objet to be printed. Further, the image color designation information is an execution condition to execute the ROP process, and is information designating the color inside the image when the ROP process is executed.

The map data regarding the print resolution, the sheet type of the printing sheet, the document type of the object to be printed, and the image color designation information are stored in the data storage area 34. The map data defines, for each of the print resolution, the sheet type of the printing sheet, the document type of the object to be printed and the image color designation information (hereinafter, referred to as setting information), whether the first drawing function is recommended or deprecated as shown in FIG. 5. It is noted that, according to the present embodiment, the first drawing function means the function DrvStretchBltROP.

When information regarding the print resolution is included in the setting information extracted from the function DrvStretchBltROP, the printer driver 26 determines, referring to the map data as shown in FIG. 5 and based on the information regarding the print resolution, whether the drawing process using the function DrvStretchBltROP should be executed. That is, the printer driver 26 determines whether the setting information regarding the print resolution is set such that the first drawing function is recommended or deprecated (see FIG. 5). According to the present embodiment, when the setting information regarding the print resolution represents the print resolution of 1200 dpi or 600 dpi, the printer driver 26 determines that the first drawing function is recommended for the print resolution. When the setting information regarding the print resolution represents the print resolution of 300 dpi, the printer driver 26 determines that the first drawing function is deprecated for the print resolution. That is, the printer driver 26 determines that the drawing process using the function DrvStretchBltROP should be executed when the print resolution is 1200 dpi or 600 dpi, while the drawing process using the function DrvStretchBltROP should not be executed when the print resolution is 300 dpi.

It is because, when the print resolution in executing the printing process is relatively low, the data amount of the image data for printing is small, and the necessity of executing the drawing process using the function DrvStretchBltROP, or the necessity of reducing the data amount of the original image data and executing the drawing process using the image data of which data amount has been reduced is low. On the other hand, when the print resolution in executing the printing process is relatively high, the data amount of the image data for printing is large, and the necessity of executing the drawing process using the function DrvStretchBltROP, or the necessity of reducing the data amount of the image data and executing the drawing process using the image data of which data amount has been reduced is high.

It is noted that, when the printer driver 26 determines that the drawing process using the function DrvStretchBltROP should be executed, the printer driver 26 creates the image data for printing in accordance with the setting information included in the function DrvStretchBltROP. Then, the printer driver 26 transmits the thus created image data for printing to the printer 50. According to the above configuration, when the data amount of the image data is relatively large, the printer 50 can execute the printing process based on the image data of which data amount is relatively small, and a speed-down of the printing process, oppression of the memory capacity of the printer 50 can be suppressed.

When the printer driver 26 determines that the drawing process using the function DrvStretchBltROP should not be executed, the printer driver 26 transmits information representing that the drawing process using the function DrvStretchBltROP is not executed (hereinafter, referred to as non-execution information) to the OS 28. Concretely, the printer driver 26 include the setting information previously extracted in a function EngStretchBltROP, and the printer driver 26 calls the function EngStretchBltROP. The function EngStretchBltROP is a function to return the setting information to the OS 28. When the function EngStretchBltROP is called by the printer driver 26, the OS 28 outputs an execution instruction designating a drawing process which is different from the drawing process using the function DrvStretchBltROP. For example, the OS 28 designates the drawing process using the function DrvBitBlt, and transmits the execution instruction, again, of the drawing process to the printer driver 26. Then, in accordance with the setting information included in the function DrvBitBlt, the printer driver 26 creates the image data for printing, and transmits the thus created image data for printing to the printer 50.

It is noted that, when the function EngStretchBltROP is called, there may be a case where the OS 28 executes an OS-standard drawing process, without transmitting the execution instruction to the printer driver 26, to create the image data and transmit the thus created image data to the printer driver 26. Optionally, when the image data is created in the OS-standard drawing process, the printer driver 26 may further process the image data so that printer 50 can print the image data easily. According to the above configuration, when the data amount of the image data is relatively small, it becomes possible that the printer 50 executes the printing process based on the all-pixel designated image data, thereby execution of an appropriate printing process being guaranteed.

When information regarding the sheet type is included in the setting information extracted from the function DrvStretchBltROP, the printer driver 26 determines, referring to the map data as shown in FIG. 5 and based on the information regarding the sheet type, whether the drawing process using the function DrvStretchBltROP should be executed. That is, the printer driver 26 determines whether the setting information regarding the sheet type is set such that the first drawing function is recommended or deprecated (see FIG. 5). According to the present embodiment, when the setting information regarding the sheet type represents the normal sheet or the thick sheet, the printer driver 26 determines that the first drawing function is recommended for the print resolution. When the setting information regarding the sheet type represents the inkjet sheet or the glossy sheet, the printer driver 26 determines that the first drawing function is deprecated for the print resolution. That is, the printer driver 26 determines that the drawing process using the function DrvStretchBltROP should be executed when the sheet type is the normal sheet or the thick sheet, while the drawing process using the function DrvStretchBltROP should not be executed when the sheet type is the inkjet sheet or the glossy sheet.

When the setting information regarding the sheet type represents the inkjet sheet or the glossy sheet, the image subject to print is assumed to be an image including a photograph or the like. To the image including the photograph, the repetitive drawing process or the image synthesizing process command is not suitable. That is, when the image includes a photograph, or a natural image, it is likely that there could occur differences between the image displayed on the LCD 16 and the printed image on which, in the printer, the repetitive drawing process and/or the image synthesizing process has been executed.

Accordingly, when the setting information regarding the sheet type represents the inkjet sheet or the glossy sheet, the first drawing function is set to be deprecated, and the printer driver 26 determines that the drawing process using the function DrvStretchBltROP should not be executed. As above, it becomes possible to prevent execution of the drawing process using the function DrvStretchBltROP on the image which is assumed not to suitable for the repetitive drawing process.

When the setting information regarding the sheet type represents the normal sheet or the thick sheet, there is a possibility that the image subject to print is an image which does not include photographs, but includes a plurality of same symbols. Therefore, when the setting information regarding the sheet type represents the normal sheet or the thick sheet, the first drawing function is set to be recommended (see FIG. 5), and the printer driver 26 determines that the drawing process using the function DrvStretchBltROP should be executed. Accordingly, it becomes possible to execute the drawing process using the function DrvStretchBltROP on the image including a plurality of same symbols or the like, that is, on the image suitable for the repetitive drawing process.

When information regarding the document type is included in the setting information extracted from the function DrvStretchBltROP, the printer driver 26 determines, referring to the map data as shown in FIG. 5 and based on the information regarding the document type, whether the drawing process using the function DrvStretchBltROP should be executed. That is, the printer driver 26 determines whether the setting information regarding the document type is set such that the first drawing function is recommended or deprecated (see FIG. 5). According to the present embodiment, when the setting information regarding the document type represents the text or the graph, the printer driver 26 determines that the first drawing function is recommended. When the setting information regarding the document type represents the photograph, the printer driver 26 determines that the first drawing function is deprecated. That is, the printer driver 26 determines that the drawing process using the function DrvStretchBltROP should be executed when the document type is the text or the graph, while the drawing process using the function DrvStretchBltROP should not be executed when the document type is the photograph.

It is because the image including a photograph and the like may not be appropriately processed in accordance with the repetitive drawing process. Thus, when the setting information regarding the document type is the photograph, the first drawing function is deprecated, and the printer driver 26 determines that the drawing process using the function DrvStretchBltROP should not be executed. According to the above configuration, it is possible to prevent execution of the drawing process using the function DrvStretchBltROP on the image assumed not to suitable for the repetitive drawing process.

When the setting information regarding the document type is the text or the graph, it is possible that the image subject to print does not include photographs, but includes a plurality of the same symbols or the like. Therefore, when the setting information regarding the document type is the text or the graph, the first drawing function is recommended, and the printer drive 26 determines that the drawing process using the function DrvStretchBltROP should be executed. As above, it becomes possible that the drawing process using the function DrvStretchBltROP is executed on the image including a plurality of the same symbols or the like, that is, on the image suitable for the repetitive drawing process.

Further, when the image color designation information is included in the setting information extracted from the function DrvStretchBltROP, the printer driver 26 determines, based on the image color designation information, whether or not the drawing process using the function DrvStretchBltROP, referring to the map data shown in FIG. 5. That is, the printer driver 26 determines whether the image color designation information is set to such that the first drawing function is recommended or deprecated. When the image color designation information is set to "0x0000", "0x0001" or "0x0005", the printer driver 26 determines that the first drawing function is deprecated, while when the image color designation information is set to information other than "0x0000", "0x0001" and "0x0005", the printer driver 26 determines that the first drawing function is recommended. That is, when the image color designation information is set to one of "0x0000", "0x0001" and "0x0005", the printer driver 26 determines that the drawing process using the function DrvStretchBltROP should not be executed. Further, when the image color designation information is set to information other than "0x0000", "0x0001" and "0x0005", the printer driver 26 determines that the drawing process using the function DrvStretchBltROP should be executed.

For example, when "0x0000", "0x0001" or "0x0005" of the image color designation information corresponds to a process which the printer 50 is weak to execute, the first drawing function is set to be deprecated for "0x0000", "0x0001" or "0x0005" of the image color designation information, and the printer driver 26 determines that the drawing process using the function DrvStretchBltROP should not be executed. According to the above configuration, it is possible to prevent the printer 50 from outputting unintended printouts.

When the image color designation information represents information other than "0x0000", "0x0001" and "0x0005", the image color designation information is not set as the process the printer 50 is weak to execute. Therefore, when the image color designation information represents information other than "0x0000", "0x0001" and "0x0005", the first drawing process is set to be recommended, and the printer driver 26 determines that the drawing process using the function DrvStretchBltROP should be executed. According to the above configuration, in the printer 50, the printing process is executed based on the image data of which data amount is not so large, and the printing process can be executed without applying relatively large load to the printer 50.

As described above, in the PC 10, the printer driver 26 determines whether or not the drawing process using the function DrvStretchBltROP should be executed in accordance with various situations. When the printer driver 26 determines that the drawing process using the function DrvStretchBltROP should be executed, the drawing process using the function DrvStretchBltROP is executed. On the other hand, when the printer driver 26 determines that the drawing process using the function DrvStretchBltROP should not be executed, the printer drive 26 transmits non-execution information to the OS 28. Then, the drawing process using a function different from the function DrvStretchBltROP (e.g., the function DrvBitBlt) is designated, and the drawing process using the designated function (e.g., the function DrvBitBlt) is executed. According to the above configuration, it becomes possible that the printer driver 26 executes appropriate drawing processes suitable for the situations, respectively.

In the map data shown in FIG. 5, four items (i.e., the print resolution, the sheet type, the document type and the color designation information) are indicated. It is noted that the above-described four items are only examples, and the map data may be modified to optionally or alternatively include other items as indicated (1)-(6) below.

(1) For example, the item may include a connection method between the PC 10 (i.e., the printer driver 26) and the printer 50. For example, the printer driver 26 may obtain a value representing a connection method between the printer driver 26 and the printer 50 (e.g., a port name, or a value indicating a kind of print port set to the printer driver 26). Then, for example, when the connection method is a USB connection, the first drawing process may be executed, while, when the connection method is a network connection (e.g., LAN, WLAN, Bluetooth®), the non-execution information may be transmitted to the OS 28.

(2) Alternatively, when the connection method is a wired connection method (e.g., USB, LAN), the first drawing process may be executed, while, when the connection method is a wireless connection method (e.g., WLAN, Bluetooth®), the printer driver 26 may transmit the non-execution information to the OS 28.

(3) Optionally or alternatively, the item of the map data shown in FIG. 5 may include a usage area of the printer driver 26. For example, the printer driver 26 may obtain a value representing a usage area (e.g., area information, language information or the like, which is set to the OS 28). Then, when the area information includes a value indicative of a first country, the printer driver may execute the first drawing process, while, when the area information includes a value indicative of a second country which is different from the first country, the printer driver 26 may transmit the non-execution information to the OS 28.

(4) Further, the printer driver 26 may obtain a value representing a usage area. Then, when the area information includes a value indicative of a country using a language of which character data requires a particular number of bytes (e.g., four bytes) or more, the printer driver 26 may transmit the non-execution information to the OS 28.

(5) Furthermore, the printer driver 26 may obtain a value representing a usage area. Then, when the area information includes a value indicative of a country using a language in which a character arranged with a particular character on the right side thereof should be modified to a character different from the character which need not be modified when the particular character is arranged on the right side, the printer driver 26 may transmit the non-execution information to the OS 28.

(6) Alternatively or optionally, the item of the map data may include a print setting to be obtained from the OS 28. That is, the printer driver 26 may obtain the print setting from the OS 28. When the print setting indicates a first value representing that the printer driver 26 instructs the printer 50 to print with use of image data (e.g., font data, template image data) which has been stored in the printer in advance, the printer driver 26 may execute the first drawing process, while, when the print setting is not the first value, the printer driver 26 may transmit the non-execution information to the OS 28.

It is noted that the aspects of the present disclosure could be applied to a text drawing function for drawing texts in addition to the drawing function executing the ROP process as described above. The modifications (3)-(6) are particularly effective when applied to the text drawing functions.

It is noted that the aspects of the present disclosure could be applied to a command drawing function which generates a command with which the printer driver 26 instructs the printer to draw an image. The modifications (3)-(6) are particularly effective when applied to the drawing functions to draw texts.

<Process of Printer Driver>

Execution of the function EngAssociateSurface, and execution of the function DrvBitBlt are realized as the printer driver 26 is executed by the CPU 12 of the PC 10. Hereinafter, referring to FIGS. 6 and 7, processes of the printer driver 26 will be described.

Figure 6:
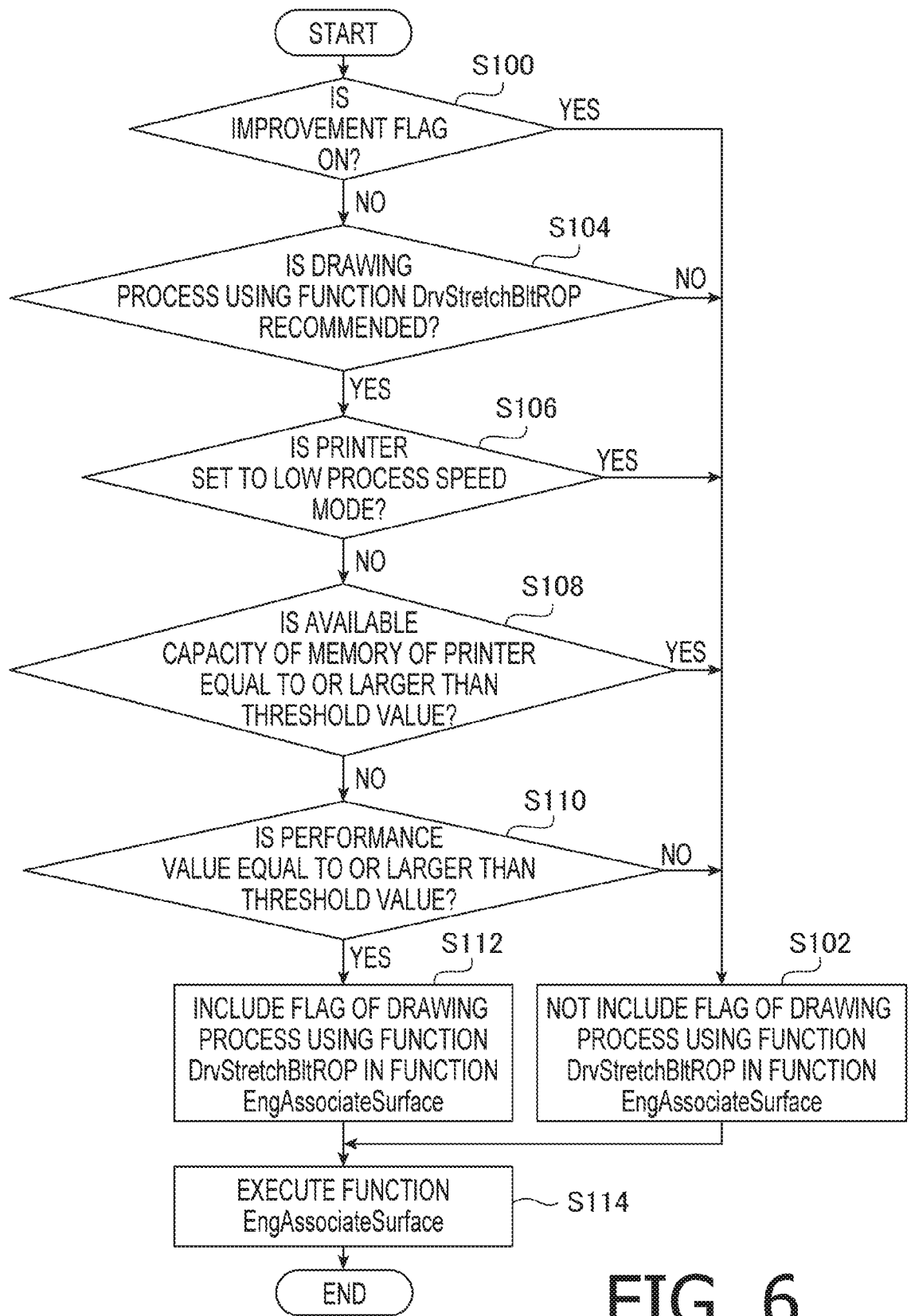
FIG. 6 is a flowchart illustrating an operation of a printer driver according to the illustrative embodiment.

A process shown in FIG. 6 is started when the printer driver 26 receives an inquiry of the driver-executable drawing process from the OS 28, namely, when the function DrvEnableSurface is called by the OS 28. When the process shown in FIG. 6 starts, the printer driver 26 obtains an improvement flag from the data storage area 34 and determines whether the improvement flag is set to ON or OFF (S100). For example, the printer driver 26 retrieves information stored in the data storage area 34 to obtain information from the data storage area 34. When the improvement flag is set to ON (S100: YES), the printer driver 26 does not include the flag of the drawing process using the function DrvStretchBltROP in the function EngAssociateSurface (S102).

When the improvement flag is set to OFF (S100: NO), the printer driver 26 obtains the recommendation information and determines whether the recommendation information recommends execution of the printing process of the image based on the partial-pixel designated image data or the image synthesizing process command (S104). That is, the printer driver 26 determines whether the recommendation information recommends execution of the drawing process using the function DrvStretchBltROP. When the recommendation information does not recommend execution of the drawing process using the function DrvStretchBltROP (S104: NO), the printer driver 26 does not include the flag of the drawing process using the function DrvStretchBltROP (S102).

When the recommendation information indicates that the drawing process using the function DrvStretchBltROP is recommended (S104: YES), the printer driver 26 determines when the printer 50 is set to a low process speed mode (S106). For example, the printer driver 26 communicates with the printer 50 and receives, from the printer 50, the setting information, status information, performance information and the like of the printer 50. The printer driver 26 determines whether the setting information indicates the low process speed mode. The status information as received include, for example, information indicating available capacity of the memory. The performance information as received includes, for example, information indicating the processing power of the CPU provided to the printer 50. When the printer 50 is set to the low process speed mode (S106: YES), the printer driver 26 does not include the flag of the drawing process using the function DrvStretchBltROP in the function EngAssociateSurface (S102).

When the printer 50 is not set to the low process speed mode (S106: NO), the printer driver 26 determines whether or not the available capacity of the memory of the printer 50 is equal to a threshold value or more (S108). For example, the printer driver 26 determines whether or not the status information received from the printer 50 indicates that the available capacity of the memory of the printer 50 is equal to the threshold value or more. When it is determined that the available capacity of the memory of the printer 50 is equal to the threshold value or more (S108: YES), the printer driver 26 does not include the flag of the drawing process using the function DrvStretchBltROP in the function EngAssociateSurface (S102).

When the available memory of the printer 50 is less than the threshold value (S108: NO), the printer driver 26 determines whether or not the performance value indicated by the performance information of the printer 50 is equal to or larger than a threshold value (S110). For example, the printer driver 26 determines whether or not the performance value of the CPU included in the performance information received from the printer 50 indicates the performance value equal to or larger than the threshold value. When the performance value is less than the threshold value (S110: NO), the printer driver 26 does not include the flag of the drawing process using the function DrvStretchBltROP in the function EngAssociateSurface (S102).

When the performance value is equal to or larger than the threshold value (S110: YES), the printer driver 26 includes the flag of the drawing process using the function DrvStretchBltROP in the function EngAssociateSurface (S112). After completing execution of S102 or S112, the printer driver 26 executes the function EngAssociateSurface (S114). Then, the printer driver 26 terminates the process shown in FIG. 6.

As mentioned with reference to the map data shown in FIG. 5, it is noted that the above-described process shown in FIG. 6 may be modified in various ways, and exemplary modifications (A)-(F) are indicated below.

(A) For example, the item may include a connection method between the PC 10 (i.e., the printer driver 26) and the printer 50. For example, the printer driver 26 may obtain a value representing a connection method between the printer driver 26 and the printer 50 (e.g., a port name, or a value indicating a kind of print port set to the printer driver 26). Then, for example, when the connection method is a USB connection, the flag of the drawing process using the function DrvStretchBltROP may not be included in the function EngAssociateSurface, while, when the connection method is a network connection (e.g., LAN, WLAN, Bluetooth®), the flag of the drawing process using the function DrvStretchBltROP may be included in the function EngAssociateSurface.

(B) Alternatively, when the connection method is a wired connection method (e.g., USB, LAN), the flag of the drawing process using the function DrvStretchBltROP may not be included in the function EngAssociateSurface, while, when the connection method is a wireless connection method (e.g., WLAN, Bluetooth®), the flag of the drawing process using the function DrvStretchBltROP may be included in the function EngAssociateSurface.

(C) Optionally or alternatively, the item of the map data shown in FIG. 5 may include a usage area of the printer driver 26. For example, the printer driver 26 may obtain a value representing a usage area (e.g., area information, language information or the like, which is set to the OS 28). Then, when the area information includes a value indicative of a first country, the flag of the drawing process using the function DrvStretchBltROP may not be included in the function EngAssociateSurface, while, when the area information includes a value indicative of a second country which is different from the first country, the flag of the drawing process using the function DrvStretchBltROP may be included in the function EngAssociateSurface.

(D) Further, the printer driver 26 may obtain a value representing a usage area. Then, when the area information includes a value indicative of a country using a language of which character data requires a particular number of bytes (e.g., four bytes) or more, the flag of the drawing process using the function DrvStretchBltROP may be included in the function EngAssociateSurface.

(E) Furthermore, the printer driver 26 may obtain a value representing a usage area. Then, when the area information includes a value indicative of a country using a language in which a character arranged with a particular character on the right side thereof should be modified to a character different from the character which need not be modified when the particular character is arranged on the right side, the flag of the drawing process using the function DrvStretchBltROP may be included in the function EngAssociateSurface.

(F) Alternatively or optionally, the item of the map data may include a print setting to be obtained from the 28. That is, the printer driver 26 may obtain the print setting from the OS 28. When the print setting indicates a first value representing that the printer driver 26 instructs the printer 50 to print with OS use of image data (e.g., font data, template image data) which has been stored in the printer in advance, the flag of the drawing process using the function DrvStretchBltROP may not be included in the function EngAssociateSurface, while, when the print setting is not the first value, the flag of the drawing process using the function DrvStretchBltROP may be included in the function EngAssociateSurface.

It is noted that the aspects of the present disclosure could be applied to a text drawing function or a command drawing function instead of the drawing process using the function DrvStretchBltROP. In such a case, modifications (C)-(F) are particularly effective.

In the process shown in FIG. 6, the printer driver 26 determines whether the printer driver 26 receives a drawing process execution instruction designating the drawing process using the function DrvStretchBltROP from the OS 28 (S200). When the printer driver 26 has not received the drawing process execution instruction designating the drawing process using the function DrvStretchBltROP from the OS 28 (S200: NO), the printer driver 26 repeatedly executes S200.

Figure 7:
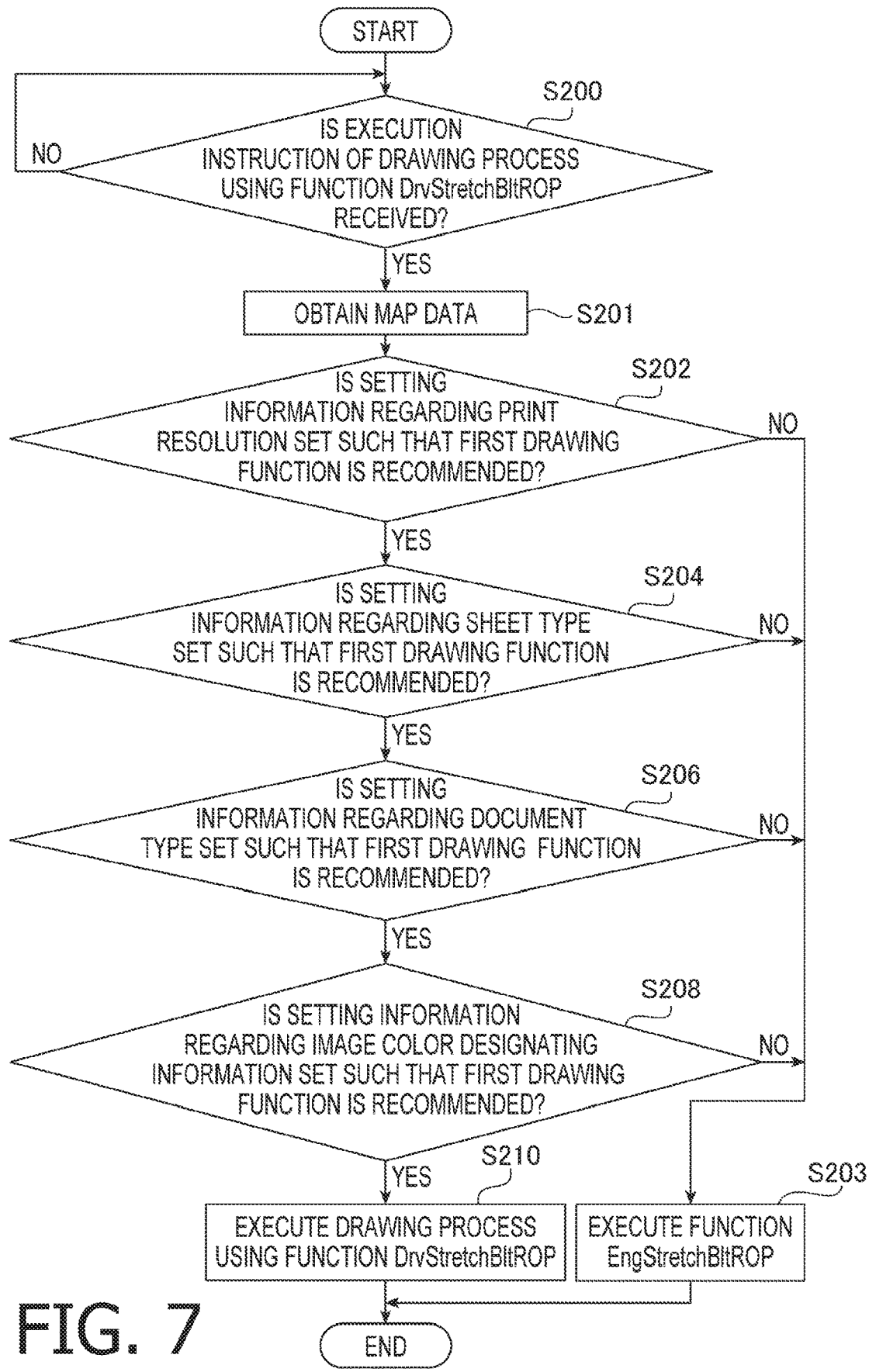
FIG. 7 is a flowchart illustrating an operation of the printer driver according to the illustrative embodiment.

When the printer driver 26 has received the drawing process execution instruction designating the drawing process using the function DrvStretchBltROP from the OS 28 (S200: YES), the printer driver 26 retrieve the map data shown in FIG. 5 from the data storage area 34 (S201). Then, referring to the map data, the printer driver 26 determines whether the setting information regarding the print resolution is set such that the first drawing function is recommended (S202). When the setting information regarding the print resolution is not set such that the first drawing function is recommended (S202: NO), that is, when the setting information regarding the print resolution is set such that the first drawing function is deprecated, the printer driver 26 executes the function EngStretchBltROP (S203). Then, the process shown in FIG. 7 is terminated.

When the setting information regarding the print resolution is set such that the first drawing function is recommended (S202: YES), the printer driver 26 determines, referring to the map data, whether the setting information regarding the sheet type is set such that the first drawing function is recommended (S204). When the setting information regarding the sheet type is set such that the first drawing function is not recommended (S204: NO), that is, when the setting information regarding the sheet type is set such that the first drawing function is deprecated, the printer driver 26 executes the function EngStretchBltROP (S203). Then, the process shown in FIG. 7 is terminated.

When the setting information regarding the sheet type is set such that the first drawing function is recommended (S204: YES), the printer driver 26 determines, referring to the map data, whether the setting information regarding the document type is set such that the first drawing function is recommended (S206). When the setting information regarding the document type is not set such that the first drawing function is recommended (S206: NO), that is, when the setting information regarding the document type is set such that the first drawing function is deprecated, the printer drive 26 executes the function EngStretchBltROP (S203). Then, the process shown in FIG. 7 is terminated.

When the setting information regarding the document type is set such that the first drawing function is recommended (S206: YES), the printer driver 26 determines, referring to the map data, whether the image color designation information is set such that the first drawing function is recommended (S208). When the image color designation information is not set such that the first drawing function is recommended (S208: NO), that is, when the image color designation information is set such that the first drawing function is deprecated, the printer drive 26 executes the function EngStretchBltROP (S203). Then, the process shown in FIG. 7 is terminated.

When the image color designation information is set such that the first drawing function is recommended (S208: YES), the printer driver 26 executes the drawing process using the function DrvStretchBltROP (S210). That is, the printer driver 26 creates the image data for printing using the function DrvStretchBltROP, and transmits the created image data for printing to the printer 50. Then, the process shown in FIG. 7 is terminated.

Effects of Embodiment and Modifications

According to the above-described configurations, the following effects can be achieved.

When the user selects the setting button 152 on the improvement screen 150, the improvement flag 50 is set to ON. In such a case, the print driver 26 does not include the flag HOOK_STRETCHBLTROP indicating the drawing process using the function DrvStretchBltROP. When the user selects the non-setting button 154 on the improvement screen 150, the improvement flag is set to OFF. In such a case, the printer driver 26 includes the flag HOOK_STRETCHBLTROP in the function EngAssociateSurface. According to the above configuration, it becomes possible to improve the quality of the printed image.

The printer driver 26 communicates with the printer 50 and determines whether the printer 50 is set to the low process speed mode. When it is determined that the printer 50 is set to the low process speed mode, the printer driver 26 does not include the flag HOOK_STRETCHBLTROP in the function EngAssociateSurface. When it is determined that the printer 50 is not set to the low process speed mode, the print driver 26 includes the flag HOOK_STRETCHBLTROP in the function EngAssociateSurface. According to the above configuration, it is ensured that the printing process is executed appropriately.

The printer driver 26 communicates with the printer 50 and obtains the capacity information indicating the available capacity of the memory. When it is determined that the value (i.e., the value of the available capacity) indicated by the capacity information is less than a threshold value, the printer driver 26 does not include the flag HOOK_STRETCHBLTROP indicating the drawing process using the function DrvStretchBltROP in the function EngAssociateSurface. When the value indicated by the capacity information is equal to or larger than the threshold value, the printer driver 26 includes the flag HOOK_STRETCHBLTROP in the function EngAssociateSurface. With this configuration, it becomes possible to suppress pressure on the memory of the printer 50.

The printer driver 26 obtains the recommendation information from the data storage area 34. When the recommendation information recommends the drawing process using the function DrvStretchBltROP, the printer driver 26 includes the flag HOOK_STRETCHBLTROP indicating the drawing process using the function DrvStretchBltROP in the function EngAssociateSurface. When the recommendation information does not recommend the drawing process using the function DrvStretchBltROP, the printer driver 26 does not include the flag HOOK_STRETCHBLTROP in the function EngAssociateSurface. According to this configuration, the drawing process in accordance with the performance of the printer 50 can be executed.

The printer driver 26 communicates with the printer 50 and obtains the performance information of the printer 50. When a value indicated by the performance information is less than a threshold value, the printer driver 26 does not include the flag HOOK_STRETCHBLTROP in the function EngAssociateSurface. When the value indicated by the performance information is equal to or larger than a threshold value, the printer driver 26 includes the flag HOOK_STRETCHBLTROP in the function EngAssociateSurface.

According to this configuration, the drawing process in accordance with the performance of the printer 50 can be executed.

The printer driver 26 executes the process of drawing the image created by the application 24 by repeatedly drawing the divided image 110 using the function DrvStretchBltROP. According to this configuration, the amount of the image data for printing can be reduced.

Aspects of the present disclosures need not be limited to the above-described embodiment, but can be modified/improved in various ways based on knowledge of person skilled in the art. For example, according to the above-described embodiment, the printer driver 26 determines whether or not the flag HOOK_STRETCHBLTROP indicating the drawing process using the function DrvStretchBltROP should be output to the OS 28 based on the improvement flag, the recommendation information, the low process speed mode, the capacity information and the performance information. However, the above determination may be made based on various pieces of information other than the above-mentioned information. It is noted that the recommendation information, the low process speed mode and the performance information are examples of the printer characteristic information. The printer information is concept which includes not only information directly indicating the characteristics of the printer (e.g., the information indicating the memory size, the information indicating the performance of the CPU and the like), but also information with which information indirectly indicating the characteristics of the printer (e.g., a model information) can be obtained when collated with, for example, catalog spec information.

In the above-described embodiment, the CPU 12 of the PC 50 executes the processes shown in FIGS. 6 and 7. It is noted that all the processes need not be executed by the CPU 12. A part of or all of the processes may be executed by ASIC and/or other logical IC(s), individually or in combination.

What is claimed is:

1. A non-transitory computer-readable medium for an information processing apparatus having a communication interface and a controller, the communication interface being configured to communicate with a printer, an operating system being installed in the information processing apparatus, the non-transitory computer-readable medium storing instructions being to cause the controller to assume a function of a drawing processor, the instructions causing, when executed, the information processing apparatus to execute:

determining whether a particular condition corresponding to a particular executable drawing process is satisfied, wherein the determining comprises:
obtaining printer related information input to the information processing apparatus;
determining that the particular condition is satisfied when a value of the printer related information indicates a first value; and
determining that the particular condition is not satisfied when the value of the printer related information is not the first value;
outputting executable process information, which includes information indicating the particular executable drawing process corresponding to the particular condition, to the operating system in response to determining that the particular condition is satisfied, outputting the executable process information, which does not include the information indicating the particular executable drawing process corresponding to the particular condition, to the operating system in response to determining that the particular condition is not satisfied, the operating system being configured to instruct the drawing processor to execute the particular executable drawing process when receiving the executable process information including the information indicating the particular executable drawing process corresponding to the particular condition, the operating system being configured not to instruct the drawing processor to execute the particular executable drawing process when not receiving the executable process information including the information indicating the particular executable drawing process corresponding to the particular condition; and
receiving a drawing instruction from the operating system after outputting the executable process information to the operating system.

2. The non-transitory computer-readable medium according to claim 1, wherein the instructions cause, when executed, the information processing apparatus to:
display an operation screen requesting a user to input the printer related information on a display of the information processing apparatus;
wherein obtaining the printer related information includes obtaining input information input through a user interface of the information processing apparatus after the operation screen is displayed; and
wherein the determining that the particular condition is satisfied includes determining that a value of the input information is the first value; and
wherein the determining that that the particular condition is not satisfied includes determining that the value of the input information is not the first value.

3. The non-transitory computer-readable medium according to claim 1,
wherein obtaining the printer related information includes obtaining printer characteristic information from the printer through the communication interface of the information processing apparatus;
wherein determining that the particular condition is satisfied includes determining that a value of the printer characteristic information indicates a first characteristic; and
wherein determining that the particular condition is not satisfied includes determining that the value of the printer characteristic information does not indicate the first characteristic.

4. The non-transitory computer-readable medium according to claim 1,
wherein obtaining the printer related information includes obtaining printer status information from the printer through the communication interface of the information processing apparatus;
wherein the determining that the particular condition is satisfied when a value of the printer status information indicates a first status; and
wherein determining that the particular condition is not satisfied when the value of the printer status information does not indicate the first status.

5. The non-transitory computer-readable medium according to claim 1, wherein the instructions cause, when executed, the information processing apparatus to output the executable process information to the operating system when receiving an output instruction to output the executable process information to the operating system.

6. The non-transitory computer-readable medium according to claim 5,
wherein obtaining the printer related information includes obtaining storage information stored in a memory of the information processing apparatus before receiving the output instruction;
wherein determining that the particular condition is satisfied includes determining when a value of the storage information is the first value; and
wherein determining that the particular condition is not satisfied includes determining when the value of the storage information is not the first value.

7. The non-transitory computer-readable medium according to claim 6,
wherein determining when the value of the storage information is the first value includes determining that the value is within a first range defined by a particular threshold value; and
wherein determining when the value of the storage information is not the first value includes determining that the value is outside the first range.

8. The non-transitory computer-readable medium according to claim 1,
wherein obtaining the printer related information includes obtaining printer characteristic information;
wherein determining that the particular condition is satisfied when a value of the printer characteristic information is within a first range defined by a particular threshold value; and
wherein determining that the particular condition is not satisfied when the value of the printer characteristic information is outside the first range.

9. The non-transitory computer-readable medium according to claim 1,
wherein obtaining the printer related information includes obtaining process performance information indicating a process performance of the printer;
wherein determining that the particular condition is satisfied when a value of the process performance information is equal to or larger than a particular threshold value; and
wherein determining that the particular condition is not satisfied when the value of the process performance information is less than the particular threshold value.

10. The non-transitory computer-readable medium according to claim 1,
wherein obtaining the printer related information includes obtaining printer status information indicating a status of the printer;
wherein determining that the particular condition is satisfied when a value of the printer status information is within a first range; and
wherein determining that the particular condition is not satisfied when the value of the printer status information is outside the first range.

11. The non-transitory computer-readable medium according to claim 1,
wherein obtaining the printer related information includes obtaining capacity information indicating an available capacity of the printer;
wherein determining that the particular condition is satisfied when a value of the capacity information is less than a first value; and
wherein determining that the particular condition is not satisfied when the value of the capacity information is equal to or larger than the first value.

12. The non-transitory computer-readable medium according to claim 1, wherein the operating system is configured such that:
when the operating system receives image data and a drawing instruction from an application, the operating system instructs the drawing processor to execute the particular executable drawing process as instructed on the image data the operating system received by instructing the particular executable drawing process indicated by the output executable process information; and
when the operating system instructs a particular executable drawing process to the drawing processor, the operating system executes a process to reduce data amount on the image data received from the application and instructs the drawing processor to execute the particular executable drawing process on the image data on which the process to reduce the data amount has been executed.

13. The non-transitory computer-readable medium according to claim 1, wherein the operating system is configured such that:
when instructing the drawing processor to execute the particular executable drawing process, the operating system executes a process of dividing an image based on image data received from an application into a plurality of pieces and creates divided image data representing one of the plurality of pieces of the divided image data as a process of reducing data amount; and
the operating system instructs the drawing processor to execute a process of drawing the image based on the image data received from the application by repeatedly drawing the image based on the divided image data as the particular executable drawing process.

14. An information processing apparatus having a controller, an operating system being installed in the information processing apparatus, the controller configured to execute:
determining whether a particular condition corresponding to a particular executable drawing process is satisfied, wherein the determining comprises:
obtaining printer related information input to the information processing apparatus;
determining that the particular condition is satisfied when a value of the printer related information indicates a first value; and
determining that the particular condition is not satisfied when the value of the printer related information is not the first value;
outputting executable process information, which includes information indicating the particular executable drawing process corresponding to the particular condition, to the operating system in response to determining that the particular condition is satisfied, outputting the executable process information, which does not include the information indicating the particular executable drawing process corresponding to the particular condition, to the operating system in response to determining that the particular condition is not satisfied, the operating system being configured to instruct a drawing processor to execute the particular executable drawing process when receiving the executable process information including the information indicating the particular executable drawing process corresponding to the particular condition, the operating system being configured not to instruct the drawing processor to execute the particular executable drawing process when not receiving the executable process information including the information indicating the particular executable drawing process corresponding to the particular condition; and
receiving a drawing instruction from the operating system after outputting the executable process information to the operating system.

* * * * *